US008763097B2

(12) United States Patent
Bhatnagar et al.

(10) Patent No.: US 8,763,097 B2
(45) Date of Patent: Jun. 24, 2014

(54) SYSTEM, DESIGN AND PROCESS FOR STRONG AUTHENTICATION USING BIDIRECTIONAL OTP AND OUT-OF-BAND MULTICHANNEL AUTHENTICATION

(76) Inventors: Piyush Bhatnagar, Morganville, NJ (US); Sridnar Reddy, New York, NY (US)

( * ) Notice: Subject to any disclaimer, the term of this patent is extended or adjusted under 35 U.S.C. 154(b) by 135 days.

(21) Appl. No.: 13/385,829

(22) Filed: Mar. 8, 2012

(65) Prior Publication Data

US 2012/0240204 A1 Sep. 20, 2012

Related U.S. Application Data

(60) Provisional application No. 61/451,604, filed on Mar. 11, 2011.

(51) Int. Cl.

| | |
|---|---|
| ***H04L 29/06*** | (2006.01) |
| ***H04L 9/32*** | (2006.01) |
| ***G06F 21/30*** | (2013.01) |
| ***G06F 21/31*** | (2013.01) |
| ***G06F 21/43*** | (2013.01) |
| *G06F 21/35* | (2013.01) |
| *G06F 17/30* | (2006.01) |
| *H04W 12/06* | (2009.01) |

(52) U.S. Cl.

CPC ................ *H04L 63/08* (2013.01); *H04L 9/321* (2013.01); *H04L 9/3226* (2013.01); *H04L 9/3271* (2013.01); *H04L 29/06755* (2013.01); *H04L 63/0428* (2013.01); *H04L 9/32* (2013.01); *H04L 2463/062* (2013.01); *G06F 21/30* (2013.01); *G06F 21/31* (2013.01); *G06F 21/35* (2013.01); *G06F 21/43* (2013.01); *G06F 17/30725* (2013.01); *H04W 12/06* (2013.01)

USPC ................ 726/5; 726/1; 726/2; 726/3; 726/4; 726/7; 726/21; 726/27; 726/28; 726/30; 713/155; 713/159; 713/168; 713/170; 713/182; 709/217; 709/219; 709/224; 709/225; 709/229

(58) Field of Classification Search

CPC ....... H04L 9/32; H04L 29/067; H04L 29/068; H04L 61/203; H04L 61/2571; H04L 63/04; H04L 63/08; H04L 2463/082; G06F 21/03; G06F 21/04; G06F 17/30725; G06F 2211/003

USPC ............. 726/1–10, 21, 26–30; 713/155–159, 713/168–186; 709/217–229

See application file for complete search history.

(56) References Cited

U.S. PATENT DOCUMENTS 6,917,923 B1 7/2005 Dimenstein
7,089,585 B1 8/2006 Dharmarajan (Continued)

OTHER PUBLICATIONS

A Novel User Authentication Scheme Based on QR-Code by Liao et al; Publisher: Journal of Networks, North America. Date: Aug. 5, 2010.*

*Primary Examiner* — Madhuri Herzog
(74) *Attorney, Agent, or Firm* — Douglas C. Wyatt

(57) ABSTRACT

Systems and methods of authentication according to the invention are provided comprising a user, a service client, a service server, a portable communications device and an authentication server, wherein the method comprises use of one time passwords and out-of-band outbound communication channels. This system gives access to authentication seekers based on OTP out of band outbound authentication mechanism. The authentication seeker or system user scans a multi-dimensional barcode or another like encoding mechanism and validates the client and triggers the out of band outbound mechanism. The portable mobile device invokes the client server to request authentication. The client server authenticates the user based on a shared secret key and the user is automatically traversed to the next page.

25 Claims, 13 Drawing Sheets

(56) References Cited

U.S. PATENT DOCUMENTS

| | | | | |
|---|---|---|---|---|
| 7,225,263 | B1 | 5/2007 | Clymer et al. | |
| 7,725,128 | B2 | 5/2010 | Marsh et al. | |
| 8,429,407 | B2 | 4/2013 | Os et al. | |
| 8,430,317 | B2 * | 4/2013 | Ross | 235/462.32 |
| 2004/0097217 | A1 | 5/2004 | McClain | |
| 2005/0171999 | A1 | 8/2005 | Bond et al. | |
| 2006/0101127 | A1 | 5/2006 | Brown | |
| 2006/0121880 | A1 | 6/2006 | Cowsar et al. | |
| 2007/0174198 | A1 * | 7/2007 | Kasahara et al. | 705/51 |
| 2011/0161674 | A1 * | 6/2011 | Ming | 713/181 |
| 2011/0219427 | A1 * | 9/2011 | Hito et al. | 726/3 |
| 2011/0270751 | A1 * | 11/2011 | Csinger et al. | 705/42 |
| 2012/0090038 | A1 * | 4/2012 | Pacella et al. | 726/30 |
| 2012/0222055 | A1 * | 8/2012 | Schaefer et al. | 725/5 |

* cited by examiner

SYSTEM, DESIGN AND PROCESS FOR STRONG AUTHENTICATION USING BIDIRECTIONAL OTP AND OUT-OF-BAND MULTICHANNEL AUTHENTICATION

RELATED APPLICATIONS

This application claims the benefit under 35 U.S.C. §119(e) of Provisional Application No. 61/451,604, filed Mar. 10, 2011, the entire contents of which are all relied upon and are fully incorporated herein by reference.

Systems and methods of authentication comprising a user, a service client, a service server, a portable communications device and an authentication server, wherein the method comprises use of one time passwords and out-of-band outbound communication channels. This invention provides a strong multi-factor authentication and transaction mechanism for Service Providers (i.e. Banks, large enterprises) to protect user identities and accounts and to provide seamless usability for end users. This system gives access to authentication seekers based on OTP out of band outbound authentication mechanism. The authentication seeker or system user scans a multi-dimensional barcode or another like encoding mechanism and validates the client and triggers the out of band outbound mechanism. The portable mobile device invokes the client server to request authentication. The client server authenticates the user based on a shared secret key and the user is automatically traversed to the next page. This invention protects the Service Providers and users from Key logger, Dictionary, Man-in-the-Middle (MITM), Man-in-the Browser (MITB), Replay, and Phishing attacks.

FIELD OF THE INVENTION

The present invention relates generally to the field of electronic security and more particularly to authentication methods and systems that use a multi-factor one-time password (OTP), out-of-band, outbound multichannel authentication process. password (OTP), out-of-band, outbound multichannel authentication process.

BACKGROUND OF THE INVENTION

The growth of the interne has spurred demand for secure, convenient and private access to networks and the web for consumers and companies. Users transmit confidential information when accessing email servers or financial accounts, making purchases online or even logging into personalized news sites. Unfortunately, the increased transmission of confidential information leads to increased risk of identity theft. Millions of Americans have become the victims of identity theft, leading to billions in losses.

Although there are various techniques designed to provide authentication to protect critical data and prevent identity theft, these techniques are subject to vulnerabilities or are difficult to use, thereby deterring wide spread implementation.

For example, a common form of authentication is the static password authentication method. In this method, a user enters a static user identification and password on a client site. A request is sent to an authentication server to validate the credentials of the user. If the credentials are valid, the user is traversed to the next page. If the user credentials are not valid, access to the next page is denied and the client site may again ask the user to enter proper credentials. However, this form of authentication is vulnerable to threats such as phishing, key logging, shoulder surfing, snooping, social engineering, brute force attack, replay, dictionary, browser cache, man in the middle (MITM) attacks and replay attacks.

To overcome some of the vulnerabilities of static passwords, random password authentication mechanisms and systems have been developed that rely upon passwords or codes that are valid for only a certain period of time. For example, a one-time password (OTP) is only valid for one login session or transaction. An example of this is RSA Secure ID, which utilizes an OTP authentication server and an OTP Client that share a secret key and a common OTP generation algorithm, to generate the one time password for each use. The one time password cannot be predicted based on knowledge of prior one time passwords. Some OTP algorithms are based on time-synchronization between the OTP authentication server and the OTP client, event based hash chain algorithms that generate a one-time password based on the previous password, or on a challenge and/or a counter.

OTP based authentication often use hard tokens (FOB keys) or soft tokens (software generated) as OTP clients. In both cases, the user enters a login identification and a combination of a fixed pin along with a token generated OTP. The use of token based OTP is prevalent in enterprises and corporate environment. Although more effective against tampering and spoofing, OTP tokens can be difficult to carry around, can get lost or broken, and are still subject to phishing, MITM or other types of attacks. OTP systems that are in-band, meaning that all information that is requested on the same node or network, are subject to a hacker being in the same environment as the authentication mechanism. Other mechanisms, such as Authenticate as a Service, use cloud computing or other web methods to deliver OTP tokens.

Multifactor authentication systems are more secure than static user identifications and passwords. However, they can be difficult and expensive to adopt and use.

Accordingly, an authentication system that mitigates some of the vulnerabilities of prior art systems is desired. Furthermore, an authentication system that provides a strong multi-factor authentication and transaction mechanism for service providers, including banks or large enterprises, to protect user identities and accounts and provide seamless usability for end users and is easy to implement is generally desired.

SUMMARY OF THE INVENTION

In one embodiment, the present disclosure is directed to methods and systems for out-of-band outbound multichannel authentication. The method may include using a service client, a service server, a portable communications device, and an authentication server. The method may include generating a barcode at the service server and transmitting the barcode to the service client through a first communications channel. The method may also include capturing the barcode with a portable communications device, decoding the barcode and decrypting the third party server credentials to obtain user information and third party server credentials and transmitting the user information and third party server credentials to an authentication server via an outbound, out-of-band communications channel by the handheld communications device. The method may also include an authentication server comparing the user information and third party server credentials to a database of user information and a database of third party server credentials, and the authentication server authenticating the user information and third party server credentials to obtain authentication results.

Accordingly, a method and system according to the invention is provided for authentication in a system comprising a user, a service client, a service server, a portable communications device, and an authentication server. The method includes providing a login portal for access by a user, wherein the login portal is in communication with the service server via a communication channel. Transmitting of user identification information is provided from the login portal to the service server. In addition, generation of a barcode at the service server is provided using the identification information and encrypting third party credentials of the service server. The barcode is transmitted by the service server to the service client through a first communications channel. The barcode is displayed or presented by the service client to a user of the portable device so that the barcode can be captured or scanned by a portable communications device. The barcode is decoded and decrypted to obtain the third party server credentials and to obtain user information and third party server credentials. The user information and third party server credentials are transmitted to an authentication server via a outbound out-of-band communications channel from the handheld communications device. The authentication server compares the user information and third party server credentials to a database of user information and a database of third party server credentials, and the authentication server authenticating the user information and third party server credentials to obtain authentication results. The authentication server transmits the authentication results to the service server and thereafter the service server can transmit the authentication results to the service client. If the authentication results are positive, the service client and the service server can establish a secure communication channel.

In addition or in the alternative, the invention can also provide that the login portal is disposed at the service client for receiving information for the user, and that the service client has a VPN client program with a preconfigured user identifier.

In addition or in the alternative, the invention can also provide for generating a barcode by generating a multi-dimensional dynamic barcode based on a preconfigured user identifier.

In addition or in the alternative, the invention can also provide that the service server is a VPN server and said VPN server includes VPN server credentials, and that the generating of a barcode includes generating a multi-dimensional dynamic barcode based on a VPN server credentials and a first OTP thereby uniquely identifying the service server.

In addition or in the alternative, the invention can also provide that the portable communications device combines the barcode with stored user credentials stored on the portable communications device.

In addition or in the alternative, the invention can also provide that the portable communications device generates a second one time access challenge.

In addition or in the alternative, the invention can also provide that the portable communications device sends user credentials and the second one time access challenge to the authentication server via a secure out-of-band communications channel.

In addition or in the alternative, the invention can also provide for transmitting the user information and third party server credentials to an authentication server via an out-of-band communications channel, and includes establishing an independent secure connection between the mobile communications device and the authentication server using pre-specified asymmetric keys or shared secrets.

In addition or in the alternative, the invention can also provide that the authentication server validates the mobile communications device based on one or more security measures, such as a second one time access challenge, shared secrets and user credentials, among other things, and that the authentication server can transmit validation information to the service server, wherein the validation information can be selected from various test information such as successful and failed validation results.

In addition or in the alternative, the invention can also provide that the generating of the barcode is performed by the service server. In addition or in the alternative, the invention can also provide that the capturing or scanning of the barcode includes using a portable communications device having an online authentication client such as a service client and a camera.

In addition or in the alternative, the invention can also provide that the step of decrypting the barcode and the combining of data extracted from the barcode is performed by the online authentication client or service client. In addition or in the alternative, the invention can also provide a login portal for access by a user at either the service client or the login portal or the service server. In addition or in the alternative, the invention can also provide that the login portal includes receiving identification information from the user at the login portal. In addition or in the alternative, the invention can also provide that the login portal is maintained by service server. Furthermore, the invention can also provide that the login portal is programmed to receive the user identification information.

In addition or in the alternative, the invention can also provide that the use of third party credentials include using third party identification information, service server IP address, authentication server IP address, one-time password, or randomly generated one-time key, among other things for additional security.

In addition or in the alternative, a method and system according to the invention can also provide for displaying the barcode by the service client or by the login portal or by service server. Similarly, the decoding of the barcode can be performed by the portable communications device. In addition or in the alternative, the portable communications device can be programmed to decode and/or decrypt the barcode and/or third party credentials.

In addition or in the alternative, a method and system according to the invention can also provide that transmitting of the user information and third party server credentials to an authentication server via a outbound out-of-band communications channel by the handheld communications device is out-of-band with respect to the communications channel between the authentication server and service server and/or between the service server and the service client. In addition, or in the alternative, a system and method according to the invention can provide that the outbound out-of-band communications channel between the handheld communications device and the authentication server requires at least a portion of the outbound out-of-band communications channel to be is physically separate from the transmissions medium than that used between the authentication server and service server and/or between the service server and the service client.

It can be appreciated that several variations of systems can be employed to effect the above-described processes. For example, an authentication system according to the invention can be provided for use in a communications network with a third party service server, wherein the authentication system includes a mobile communication device and an authentication server. The authentication server includes a communications unit, including a transmitter and a receiver; a processor; and a storage unit; and programming. The programming can provide several of the above processes, including storing user credentials and associated mobile communication device information; accepting a secure connection from the mobile communications device using security measures selected from the group of shared secrets, digital certificates and encryption mechanisms; accepting an authentication request from a service server and associating the authentication requests with the associated mobile communication device information. In addition, the mobile communication device includes a communications unit, including a transmitter and a receiver; a processor; and a storage unit and programming. The programming can provide several of the above described processes including communicating with the authentication server using an out-of-band communications channel, encrypting and decrypting of information selected from the group comprising shared secrets, digital certificates, user credentials and OTP generation keys; generating a multi-dimensional dynamic barcode based on service server credentials and a first one time access challenge so as to uniquely identify the service server, presenting said multi-dimensional dynamic barcode to a user, scanning said multi-dimensional dynamic barcode, extracting data from said barcode, and combining said barcode with user credentials stored on a mobile communications device and generating a second one time access challenge.

It is to be understood that both the foregoing description and the following description are exemplary and explanatory only and are not restrictive of the invention, as claimed.

DETAILED DESCRIPTION OF THE ILLUSTRATIVE EMBODIMENTS

Figure 1:
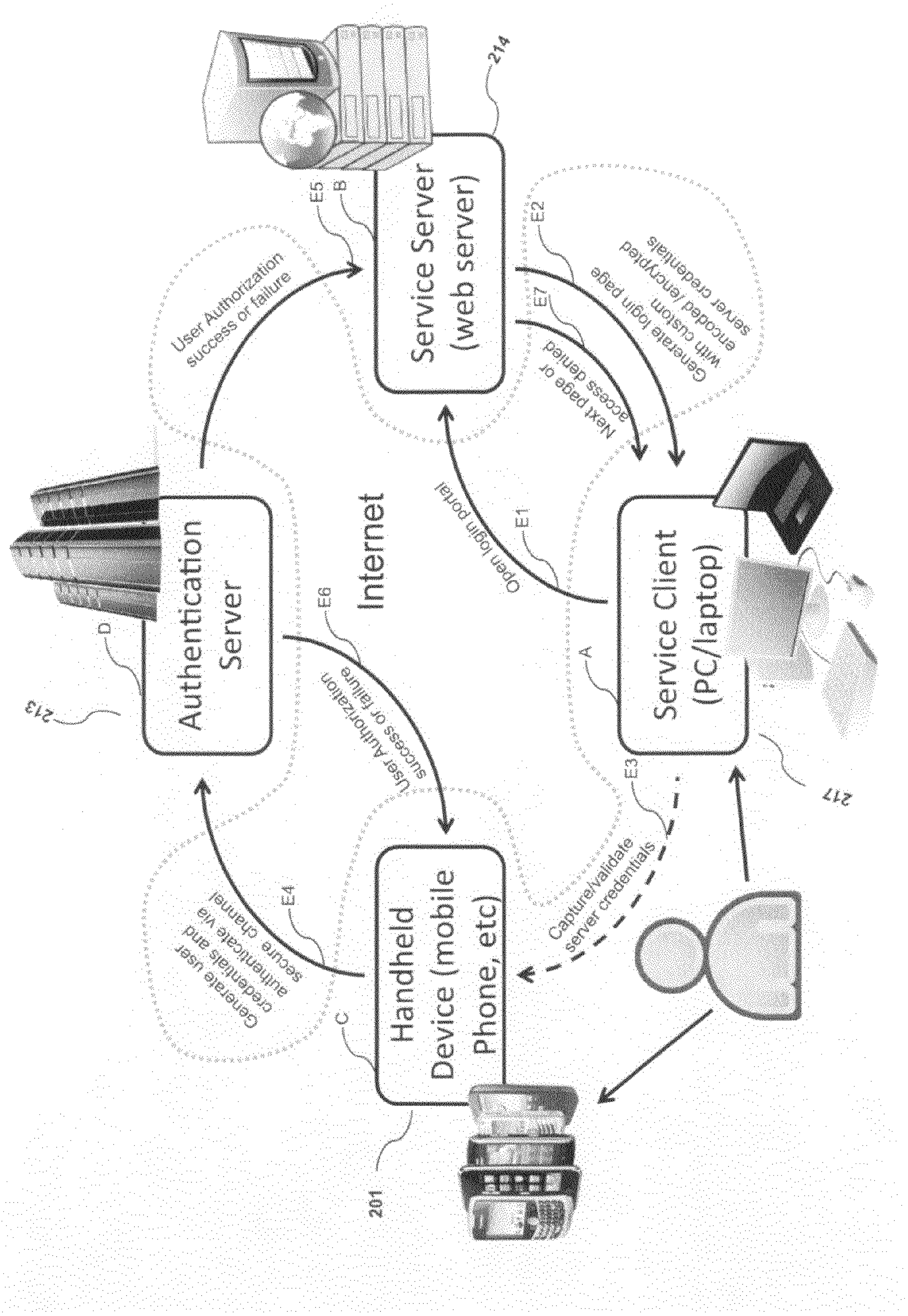
FIG. 1 is a block diagram describing the various components of an embodiment invention and depicting an example of an out-of-band outbound multichannel authentication.

FIG. 1 is a first illustrative embodiment of a system and process according to the invention. In particular, FIG. 1 shows an embodiment of an authentication system that utilizes out-of-band outbound multichannel authentication. In this particular embodiment, a user can access or open a login portal on a service client 217, also known as an online service client or a remote client, for example a PC or a laptop. ATM machines, iPads and Tablets are other examples of devices that could function as service clients. As used herein, "online service portal" may also be referred to as a "login portal." Accordingly, the Service Client 217 can transmit E1 a request to the Service Server 214 to open the login portal. User identification information is transmitted from the login portal to a third party server 214. Examples of third party servers that may be used in the present invention include service servers or web servers, and other desired target machines or services that the user is trying to authenticate to. Examples of user identification information can include user's name, user id, ISP address, credit card number, account number, and phone number.

A login page or a barcode is generated. In one embodiment of the invention, web based access is provided wherein the login page can be provided with a barcode which is dynamically generated. In another embodiment of the invention, a VPN client is provided which is residing on the Service client, and just the barcode may be generated by the VPN client. In a further embodiment, the step of generating the bar code E2 is performed by the service server along with the login page.

The step of generating the barcode or login page includes generating a barcode using the user identification information and encrypting third party credentials of the service server 214. Examples of third party credentials include third party identification information, service server IP address, authentication server IP address and a one-time password, or randomly generated one-time key.

The barcode can have many forms. For example, it can be a multi-dimensional dynamic barcode, such as a QR code. In a preferred embodiment, the step of generating a barcode includes generating a multidimensional dynamic barcode based on a preconfigured user identifier.

The barcode is transmitted E2 from the service server 214 through a communications channel to the Service Client 217. Examples of communications channels can include Wi-Fi networks, LAN connections, wireless phone networks (GRM, 3G, 4G, etc), Internet connections, or telephone line connections, or combinations thereof. The barcode or login page is then displayed by the service client 217.

Figure 2:
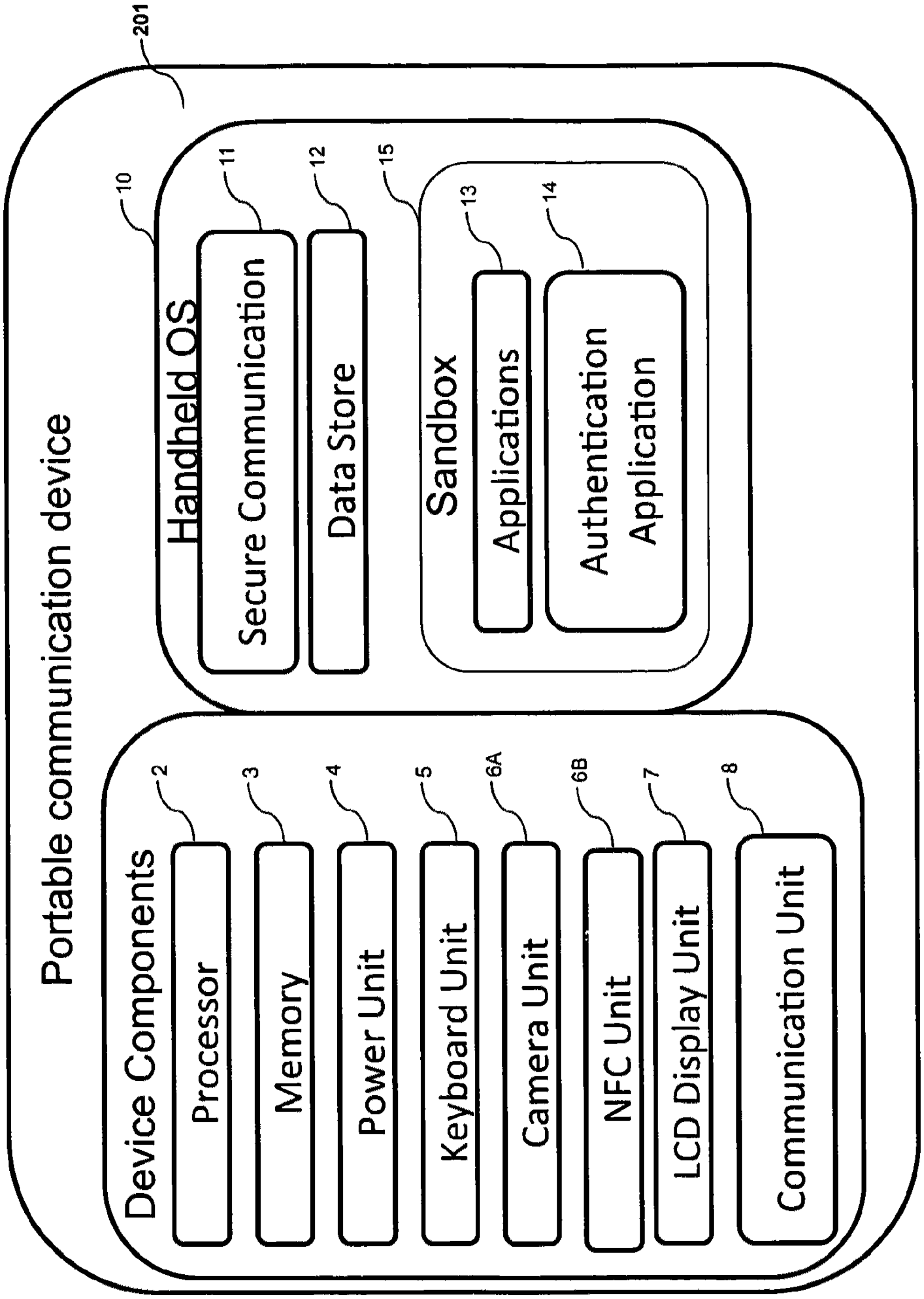
FIG. 2 is a schematic block diagram of an embodiment of a handheld portable communication device.

A portable communication device 201, such as a mobile phone, iPad, tablet, portable scanner, or other handheld device, captures E3 the barcode. A schematic block diagram of an exemplary portable communication device or hand held device is shown in FIG. 2.

The barcode is decoded and the third party credentials are decrypted to obtain user information and third party server credentials. In one embodiment, the barcode is decoded by the portable communication device 201. Decoding including programming to decoding of the barcode, for example extracting information from a two-dimensional barcode. Decryption processes include programming for taking that decoded data which is encrypted and extracting any encrypted information from it.

The user information and the third party credentials are transmitted E4 by the portable communication device 201 to an authentication server 213 through a secure channel. In one embodiment, the secure channel is an outbound, out-of-band communications channel. Out-of-band refers to utilizing a separate channel, being different from the primary channel, simultaneously used to communicate between devices or end points for the purpose of critical data transfer or exchange without the involvement of the primary channel. In one embodiment, a first communication channel is out-of-band using logically a separate communications channel than that of a second communications channel such as can be provided using CDMA. In a further embodiment, the first communication channel is out-of-band using a physically separate communications channel from that of the second communications channel such as providing the channel on a separate frequency, such as FDMA, or over a physically separate transmissions media. In a further embodiment, the out-of-band channel has an origination point that is different than that of the original request, data, or information transfer. In another embodiment, the communications channels need not be physically separate along all portions of the communication channel to constitute out-of-band so long as the communication channels are separate and independent. In addition, or in an alternative embodiment, only a portion of the communications channels need to be separate and independent of the communications channel used to transmit the barcode or login page. Examples of different out-of-band communication channels are shown throughout the drawings, for example by elements 121 and 122, wherein a first communication channel 121 is out-of-band with respect to a second communication channel 122. In addition, or in an alternative embodiment, the out-of-band communication channels are separate from the connection point of view (i.e. do not have knowledge of each other). In an alternative embodiment, the out-of-band outbound system is out of network from the original stream and it is a push from the portable device to the server. For purpose of this invention in band refers to using the same communication channel or loop The authentication server 213 compares the user information and the third party server credentials to a database of user information and a database of third party server credentials. The authentication server 213 authenticates the user information and the third party server credentials to obtain authentication results. The authentication server 213 transmits E5 the authentication results to the service server 214 and can also transmit E6 the authentication results to the portable communications device 201. The service server 214 also transmits E7 the authentication results to the service client 217. If the authentication results are positive, a secure communication may be established between the service client 217 and the service server 214, and the service client 217 may be granted access by the service server 214. Alternatively, if the authentication results are negative, the service client 217 is denied further access to the service server 214.

In one embodiment, the service client 217 has a Virtual Private Network (VPN) client program with a preconfigured user identifier. In another embodiment the service server 214 is a Virtual Private Network (VPN) server. It may include VPN server credentials. In one embodiment, the service server 214 can generate a multi-dimensional dynamic barcode based on a VPN server credentials and a first one time access challenge thereby uniquely identifying the online server. It can be appreciated by those of ordinary skill in the art that an access challenge can include a request for additional information from the user such as a secondary password, PIN, or token.

FIG. 2 illustrates the components of an embodiment of a portable communication device 201 according to the invention, such as a hand held device like a mobile phone or an iPad. The portable communications device can include various components, including a processor 2, memory 3, power unit 4, keyboard 5, camera 6A, a near field communication ("NFC") unit 6B, LCD Display 7 and a communications unit 8. The device also has an operating system 10 which includes programming for the processes utilize by the device, including programming for secure communication 11, a data storage 12 as well as a sandbox 15, containing an authentication application 14 and other applications 13 to supplement the processes of the authentication application 14. The sandbox provides a security mechanism for separating running programs and thereby enhances the security of a device according to the invention. Incorporation of an NFC unit 6B in a device according to the invention facilitates use of a device according to the invention by a user in a manner which can make the underlying processes appear seamless. It can be appreciated by a person of ordinary skill in the art to use known processes for the device including processes for providing secure communication 11 by the device 201 to provide for secure receipt and transmission of information. Containing applications 13 include software (and may be hardware capabilities/applications/libraries on the phone) that provide capabilities like picture taking and touch sensitive activity detection.

Figure 3:
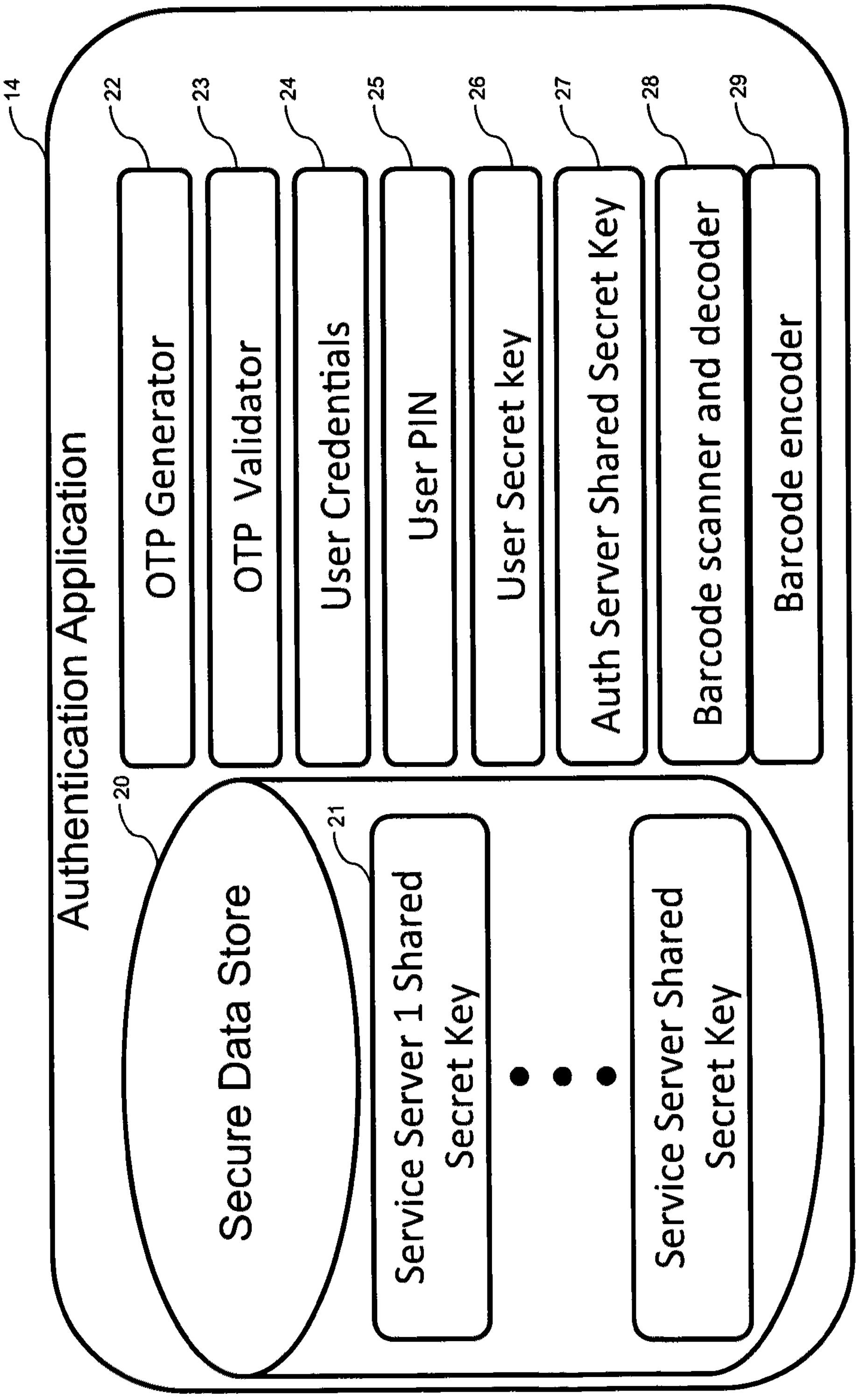
FIG. 3 is a schematic block diagram of embodiment of an authentication application that may reside in the handheld portable communication device described in FIG. 2.

FIG. 3 illustrates an embodiment of an authentication application having processes that may reside in the handheld portable communication device described in FIG. 2. It can be appreciated by a person of ordinary skill in the art that various programming can be provided to effect the processes of an device 201 according to the invention. The processes can be programmed into one or more separately discrete units. Among other things, a secure data storage 20 process can be provided to effect secure storage and retrieval of information from memory 3 on the device 201. Among other things, the secure data storage 20 can include one or more shared secret keys associated with one or more service servers 214. In addition, a one time password ("OTP") generator 22 can be provided which generates one or more one time passwords for use with the processes performed by the device 201. Additionally, a OTP validator 23 can be provided which validates the OTP passwords used by the processes performed by the device 201. The authentication application 14 can also include separate processes for managing and storing other information, such as user credentials 24, a user pin 25, user secret key 26, and an authentication server shared secret key 27 which can be stored in the secure data storage 20 or in other portions of the memory 20. Furthermore, the device 201 includes processes for a barcode scanner and decoder 28 and a barcode encoder 29, which processes can be provided separately or as part of the authentication application 14 process software. The components and arrangements of FIGS. 2 and 3 may be varied within the principles of the present application.

Figure 4:
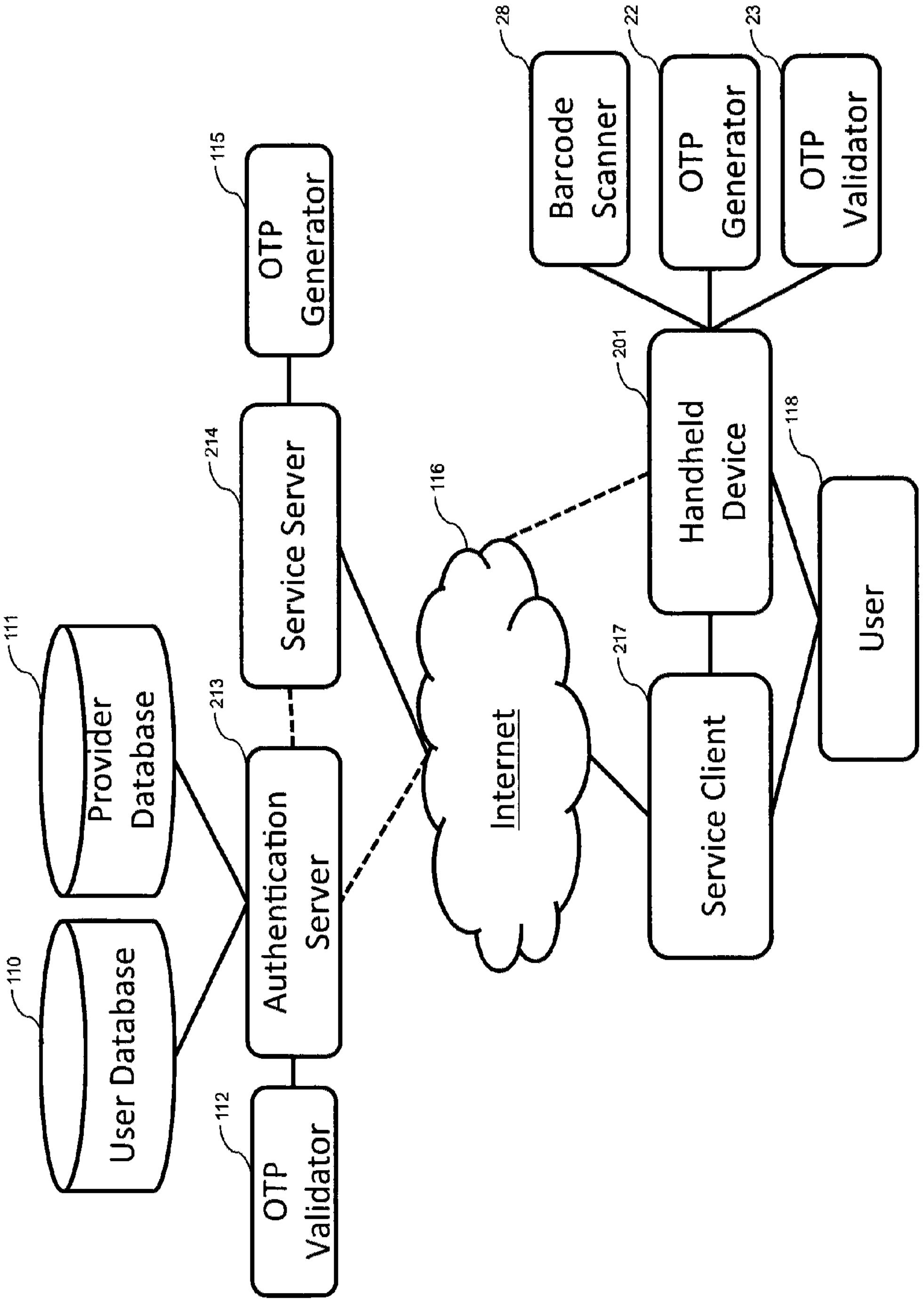
FIG. 4 is a block diagram showing the authentication process based on an embodiment of the present invention.
Figure 5:
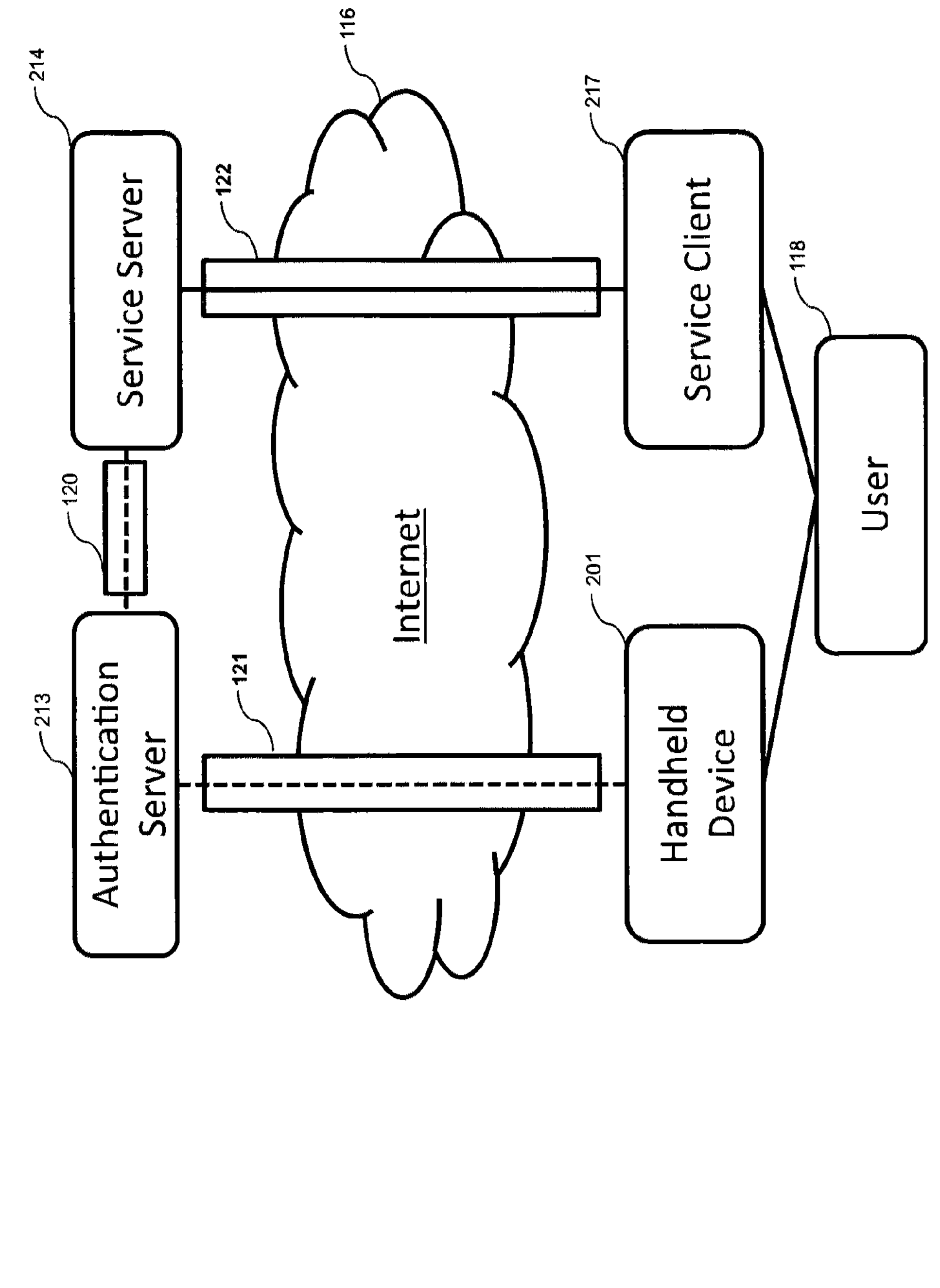
FIG. 5 is a block diagram illustrating one example of two separate communication channels in present invention.

FIG. 4 and FIG. 5 illustrate how an embodiment of an authentication system and process according to the present invention communicates. The authentication server 213 communicates with a provider database 111 and can also communicate with a user database 110. The provider database 111 includes information related to each service provider server 214, such as identification information of the service client 217, third party server credential information and security information such as shared keys. The user database 110 includes information related to each user and/or user device 201 such as identification information of the user or device 201 and security information such as shared keys. The authentication server 213 can also include a OTP validator 112 which validates the OTP passwords used by the processes performed by the authentication server 213. The authentication server 213 can be provided to communicate to the service client 217, handheld device 201 and service server 214 over communication channels including the Internet 116. In addition, or in the alternative, the authentication server 213 can be provided to communicate to the service server 214 directly. As discussed above, the handheld device 201 can include a barcode scanner, OTP generator and an OTP validator and in an alternative embodiment, the barcode scanner 28, the OTP generator 22, and/or the OTP validator 23 can be provided separately from the handheld device 201.

FIG. 5 illustrates one example of the two separate communication channels in present invention that are used for authentication process. The handheld device 201 communicates with the authentication server 213 over a communications channel 121 which is separate from the communications channel 122 over which the service client 217 and service server 214 communicate. In one embodiment of a system and process according to the invention, at least the out-bound portions of communications from the handheld device to the authentication server are provided in a separate communications channel and are out-of-band from the communication channel 122 over which the service server 214 and service client 217 communicate.

Figure 6:
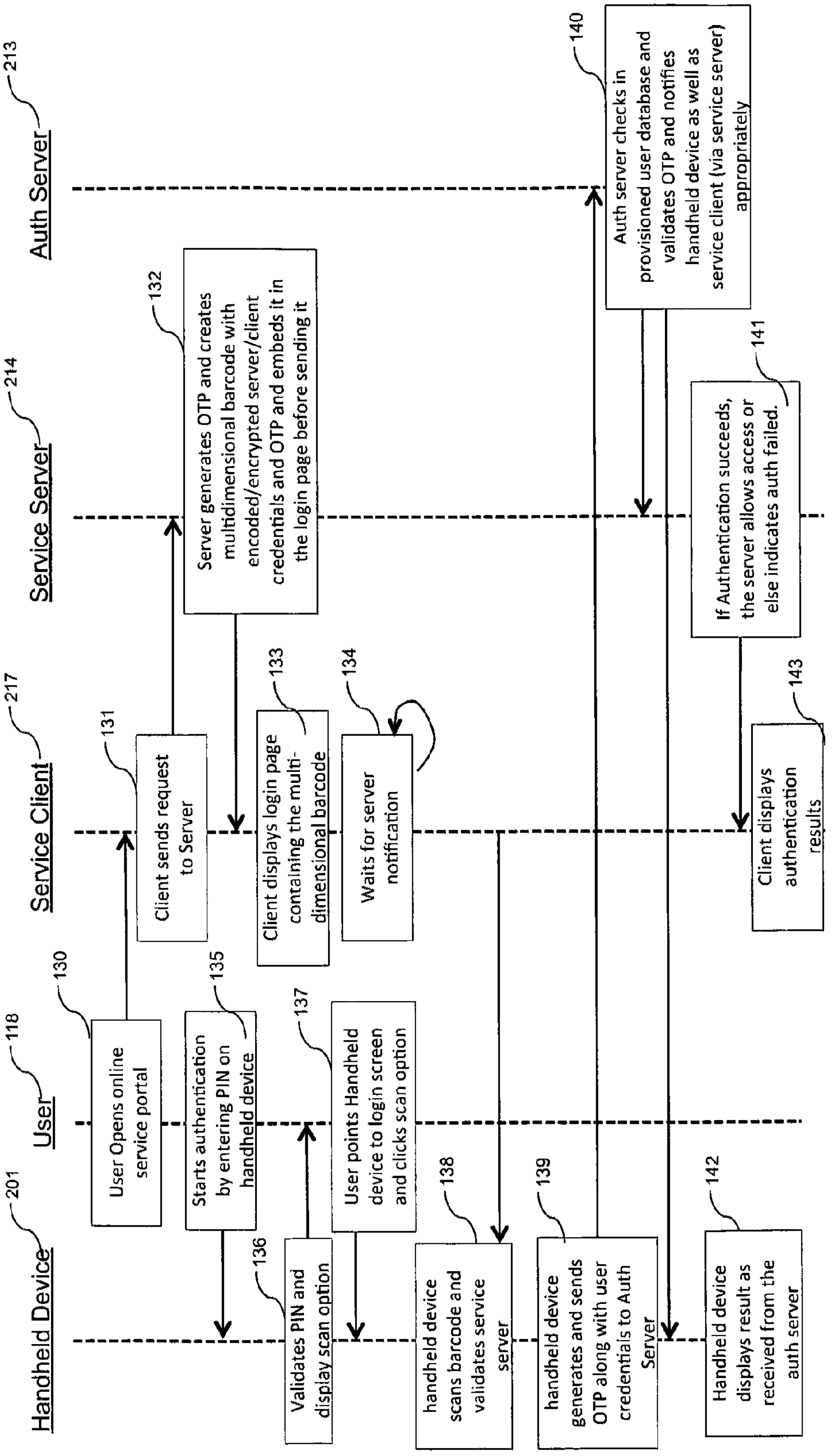
FIG. 6 is a sequence diagram describing the authentication flow based on invention as depicted in FIG. 8.
Figure 7:
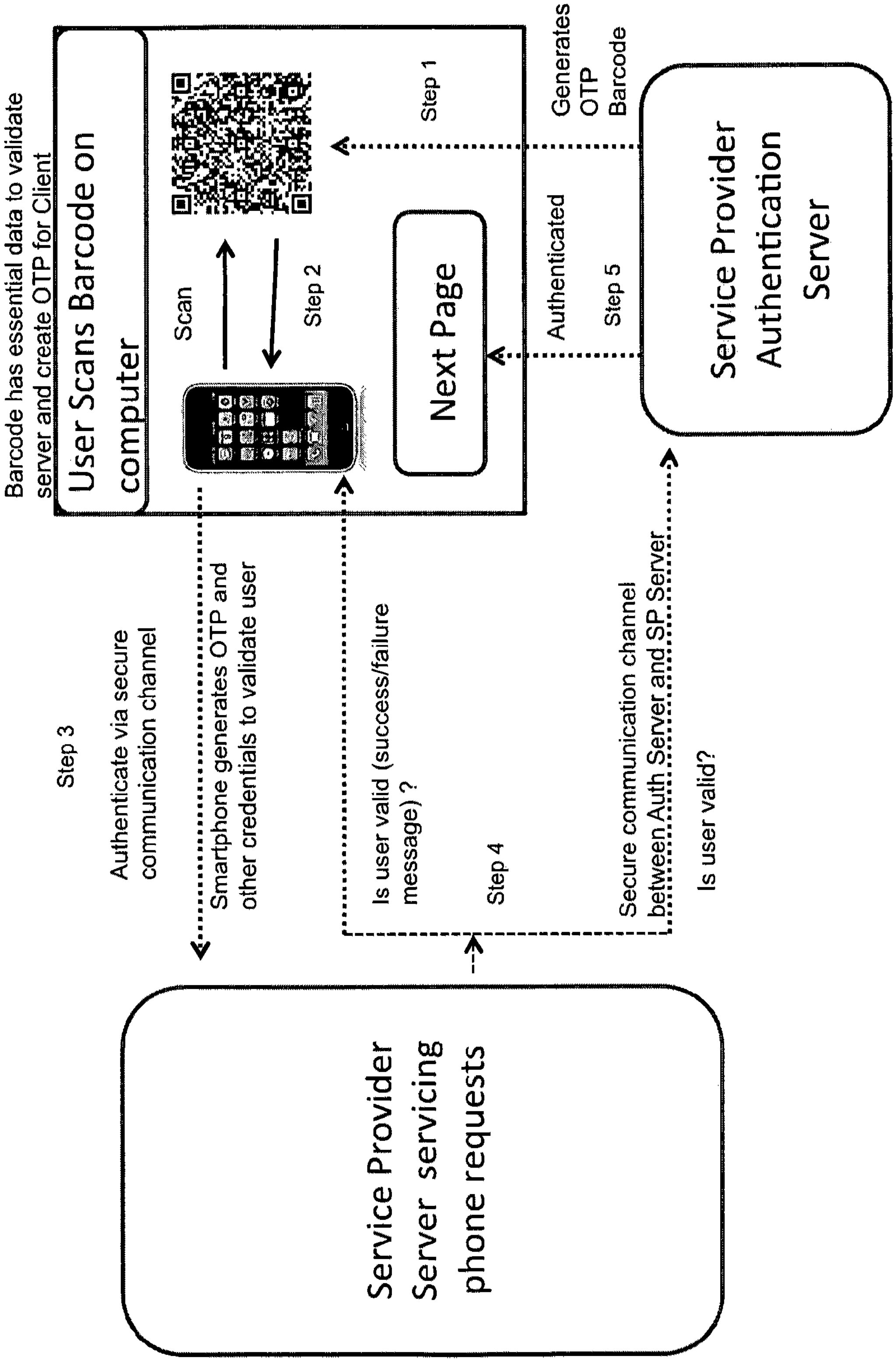
FIG. 7 is a block diagram showing the flow and authentication process based on an embodiment of the present invention.

FIGS. 6 and 7 illustrate an authentication process according to the present invention. A user opens an online service portal 130 by interacting with a service client 217. The service client 217 sends a request 131 to the service server 214. The service server 214 generates 132 a OTP and creates a multi dimensional barcode or other barcode. The barcode is encoded and/or encrypted with server and/or client credentials and a OTP. The barcode can be embedded in the login page between the service server 214 and the service client 217. Alternatively, the service provider server 214 can transmit a barcode to the service client computer 217 to be utilized at a screen page supporter by the service client 217.

During the process, the user can begin authentication 135 by providing authentication information, such as by entering a PIN on the handheld device 201. The handheld device 201 can validate the PIN and display to the user an option to scan a barcode 136. The user, using a portable communications device 201, such as a smart phone, scans the barcode 137 provided by the service client. The barcode has essential data to validate the server and create the OTP for the service client 217. The smart phone generates a OTP and other credentials to validate 138 the user and transmits the information to the authentication server 213. Authentication occurs via a secure communications channel with an authentication server 213. The Service Provider Authentication Server 213 then authenticates 140 the user credentials by matching the credentials and other information with corresponding information in the user database and also validates the OTP. Thereafter, the authentication server 213 transmits 140 a message via a secure outbound channel to the handheld device which is out-of-band with the communication channel connecting the authentication server 213 and the service server 214 indicating if the authentication was successful or not. The authentication server 213 can transmit whether not the authentication was successful to both the service server 214 and to the handheld device 201, which can display the results to the user. If the authentication was successful and the user is valid, a secure communication channel between the service provider 214 and the client 217 is established and the user is granted access to the desired next page.

Figure 8:
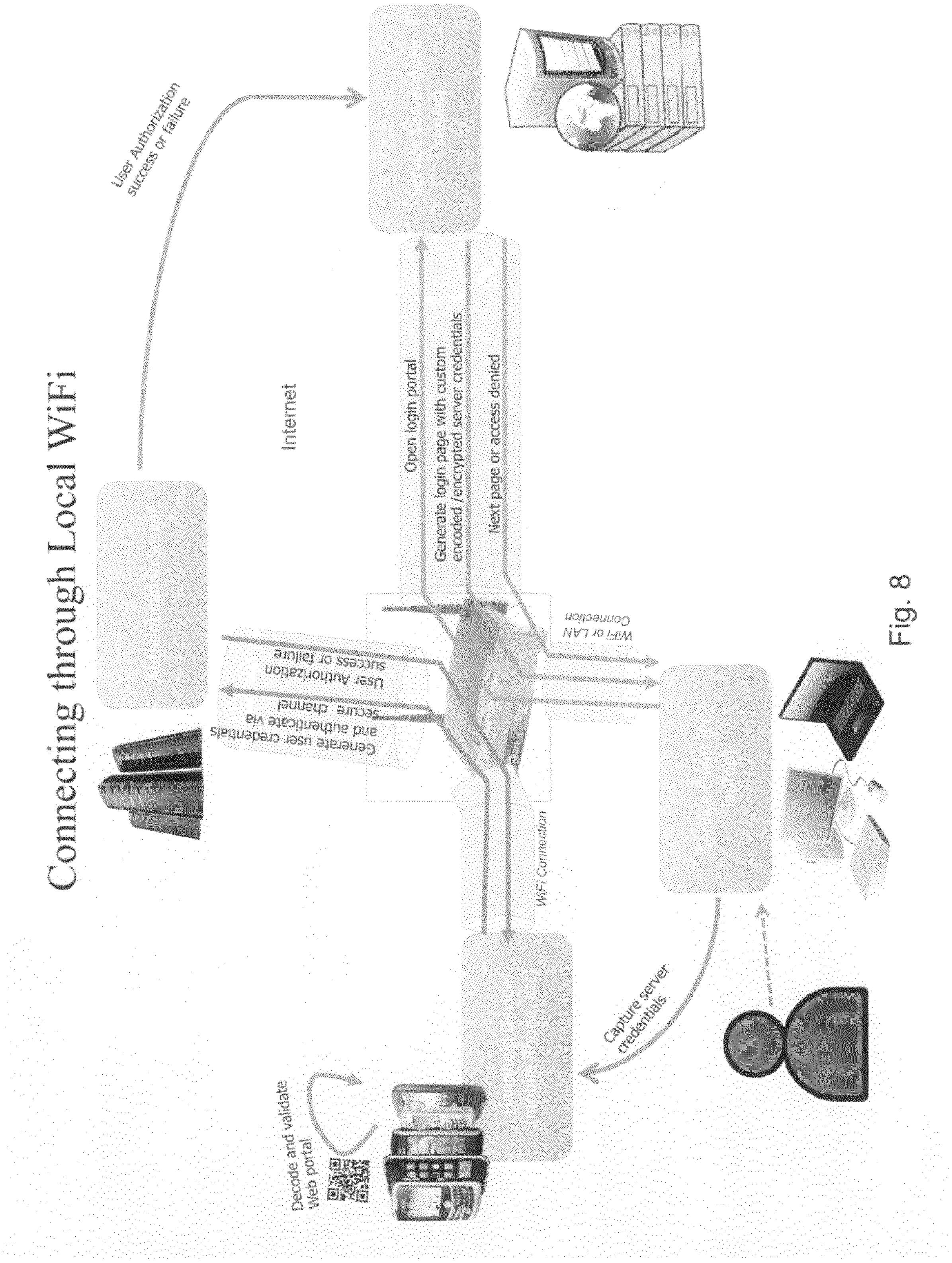
FIG. 8 is a diagram depicting one embodiment of the invention wherein the communication channels involve connection through a Wi-Fi.
Figure 9:
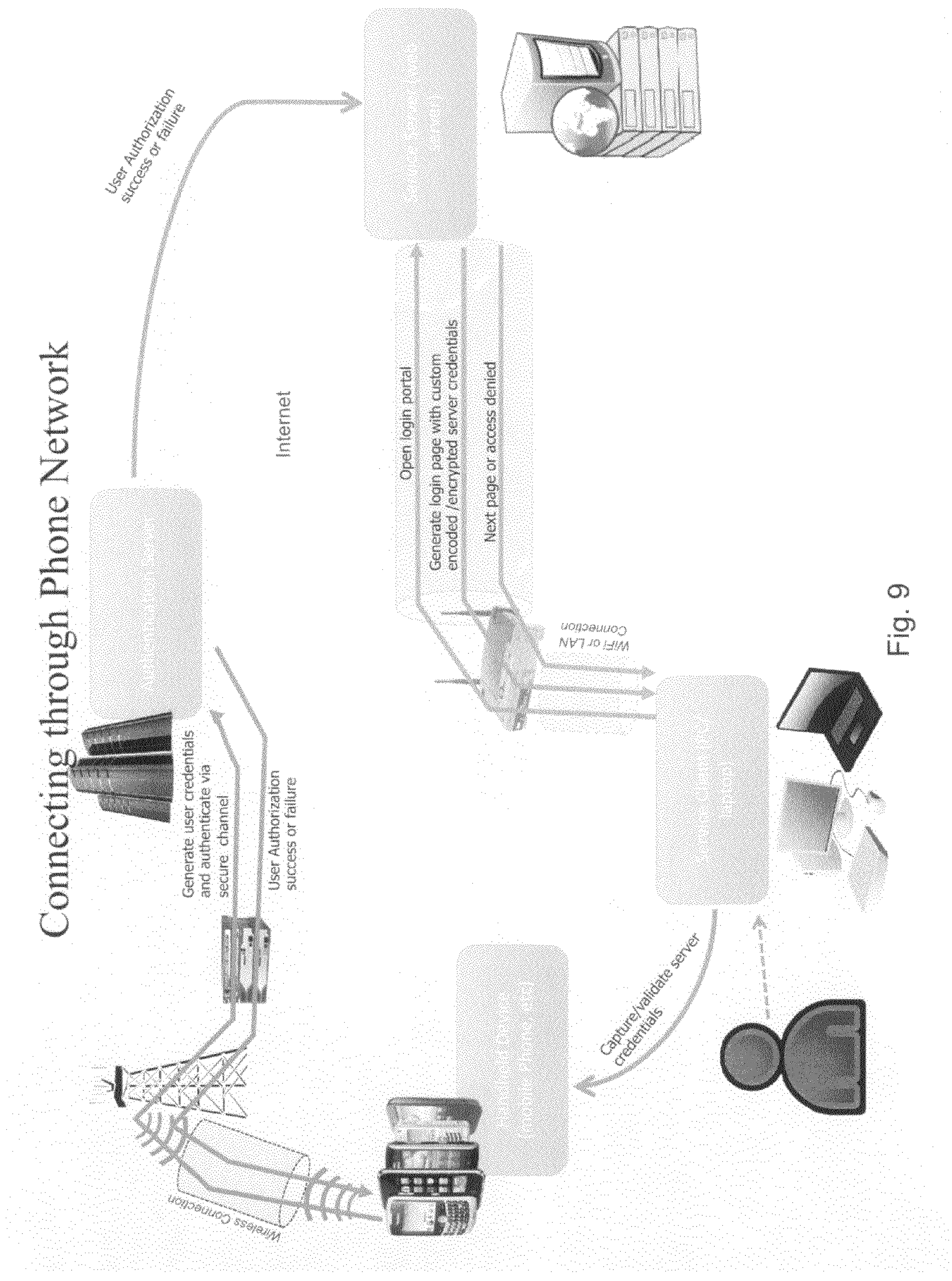
FIG. 9 is a diagram depicting one embodiment of the invention wherein the communication channels involves connection through a phone network.

FIGS. 8 and 9 illustrate additional embodiments of a system and process according to the invention utilizing different out-of-band communication channels. For example, here the communication channels are out-of-band even though they share the same Wife transmission medium and connection because at least a portion of the connection is separate and independent. The actual point to point connection is independent of the physical devices that it uses to create the connection.

Figure 10:
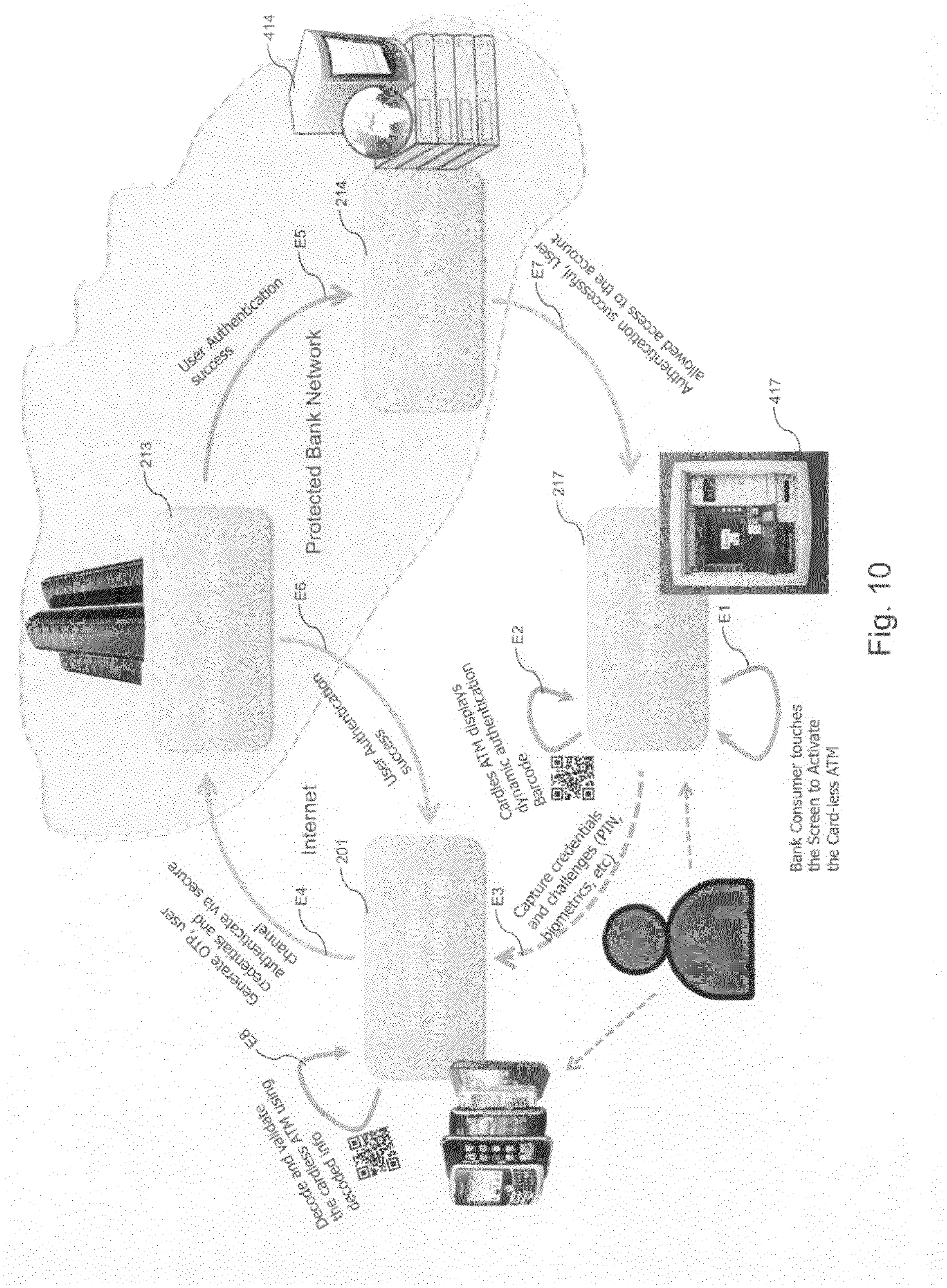
FIG. 10 is a diagram depicting an embodiment of authentication process of the present invention involving cardless Bank ATM.

FIG. 10 illustrates an alternative embodiment of the invention involving a cardless ATM machine. A bank consumer can interact with the screen of a service client 217. For example, a user touches a bank ATM 417 screen to activate the cardless ATM E1. The cardless ATM displays a dynamic authentication barcode E2. The user scans the barcode E3 with a portable communications device 201 which captures credentials and challenges (PIN, biometrics, among other things). The portable communications device 201 decodes and validates the cardless ATM using the decoded information E8. Once the validity of the ATM is ensured, the handheld device generates a OTP E4. The handheld device 201 then establishes an independent secure out-of-band outbound channel to the authentication server 213 which is out-of-band with the communication channel between the authentication server 213 and the service server 214. The handheld device then sends user credentials and the OTP E4 to the authentication server 213 directly using the secure out-of-band channel. The authentication server validates the user based on the OTP. If the authentication server finds the user credentials valid, it contacts the service server 214, such as a Bank ATM Switch 414, and indicates that user authentication was successful E5. If the user authentication was successful, a secure connection is established with the Bank ATM Switch 414 and the user is allowed access to the account.

Figure 11:
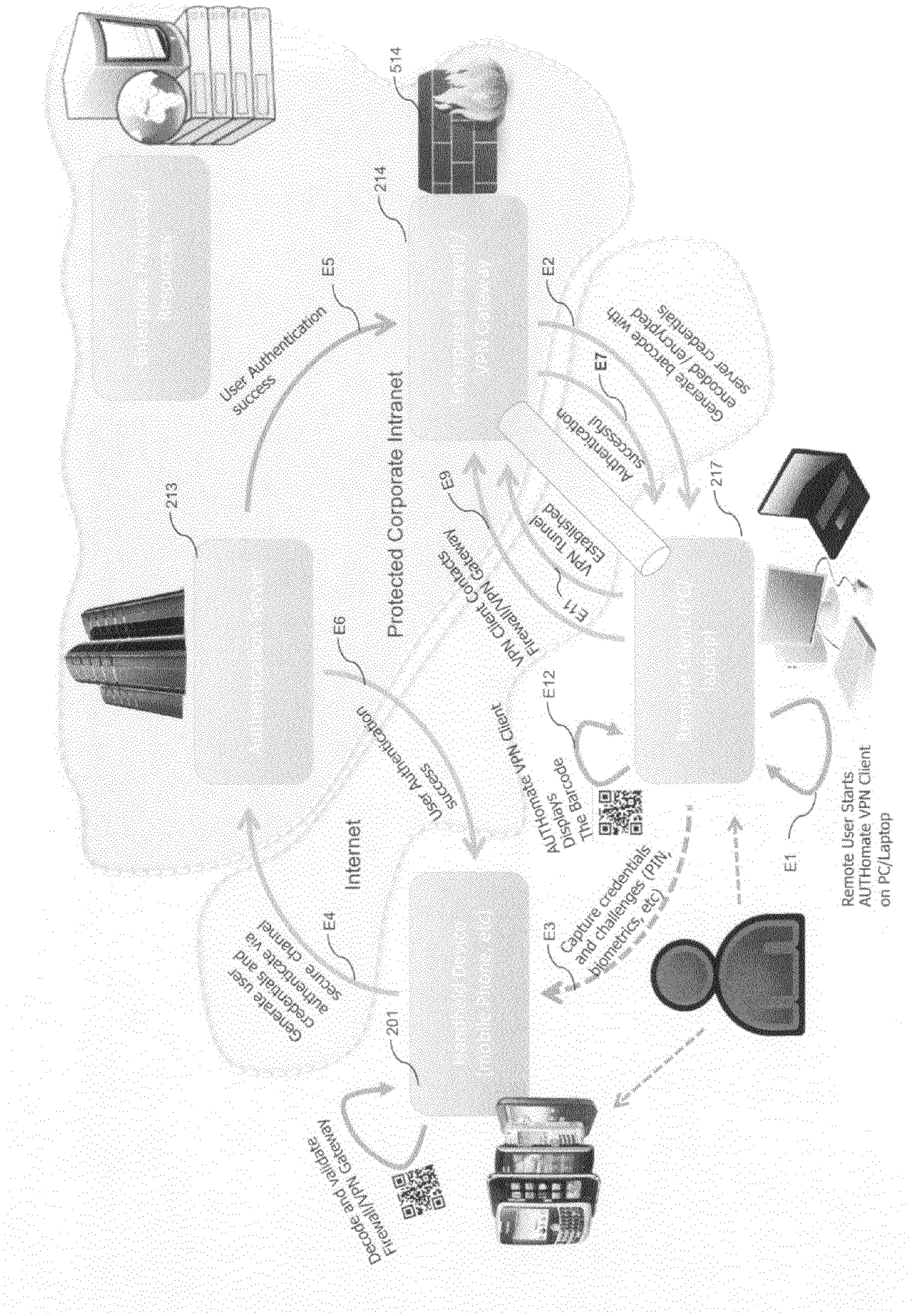
FIG. 11 is a diagram depicting an embodiment of an authentication process of the present invention involving a protected corporate intranet.

FIG. 11 is an embodiment of an authentication process of the present invention with an enterprise solution, such as a virtual private network ("VPN"). In this embodiment, the user starts the VPN client on the user's computer E1. The VPN client contacts E9 the service server 214, such as enterprise firewall or VPN gateway 514. W VPN Gateway 514 generates the barcode with encoded and/or encrypted server credentials E2. The VPN client then displays the barcode to the user E12 which can then capture the credentials and challenges (PIN, biometrics, etc) E3. In the event that authentication is successful E7, the VPN gateway 514 can open a VPN tunnel E11 and establish a secure communication with the VPN client 217.

Figure 12:
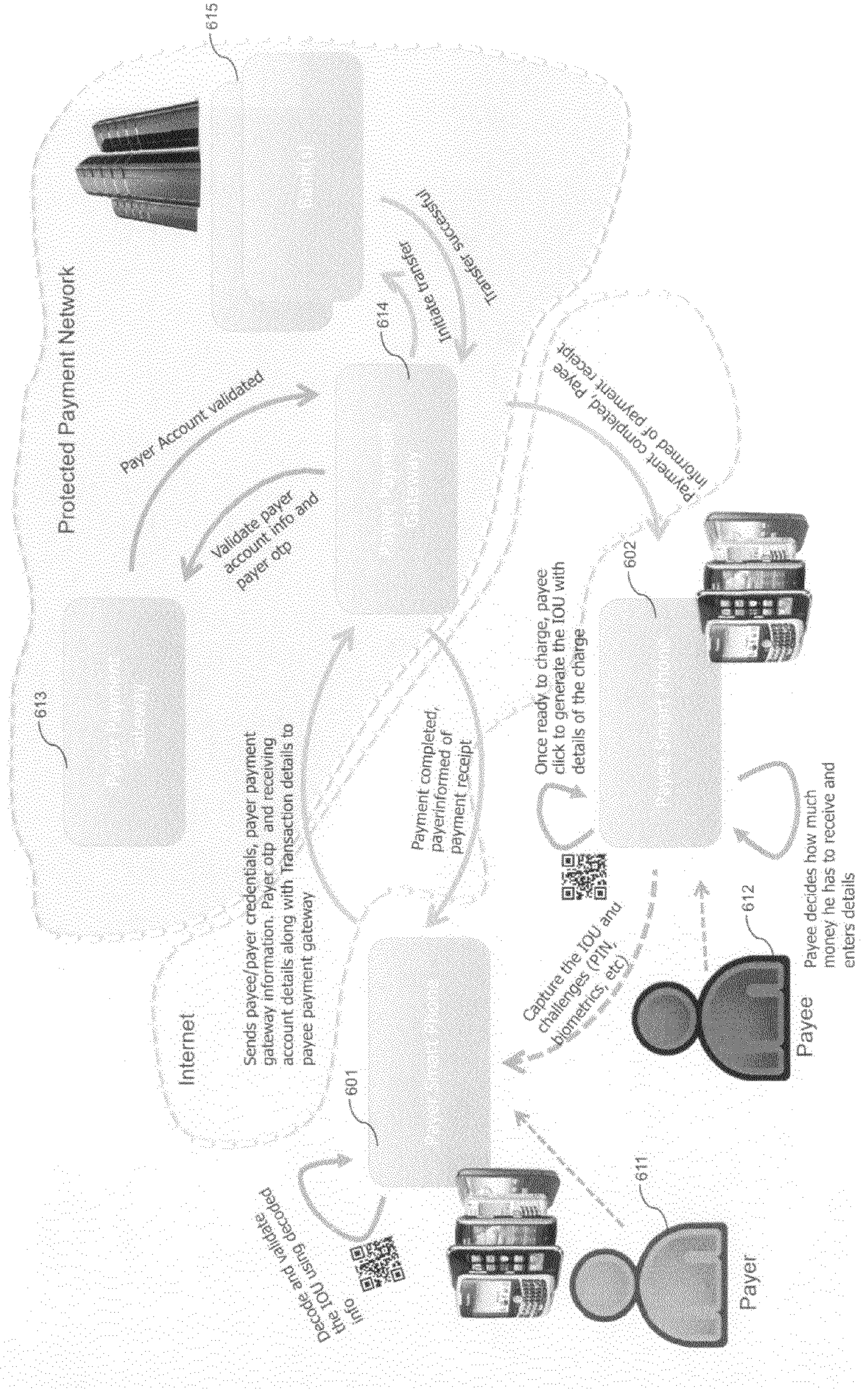
FIG. 12 is a diagram depicting an authentication process of the present invention involving P2P Payments.

FIG. 12 is a diagram depicting an embodiment of an authentication system and process of the present invention involving Person to Person payments using smart phones. Here, the process of out-of-band authentication is used by one user to make payments to another user who is also using the same software of the smart phone. In this example a first user, such as a payer 611 desires to pay second user, such as a payee 612. The payee decides how much money he desires to receive for the transaction and enters the information into the payee's handheld device 602. Once the payee is ready to generate the charge, the payee may direct the smart phone 602 to generate an invoice with details of the charge. The payee handheld device 602 can capture the invoice as well as challenges (PIN, biometrics, among other things). A user, such as a payer 611 utilizes their handheld communications device 601 to initiate a payment. The handheld communications device 601, such as a smart phone, since the payee credentials and payer credentials as well as payer payment gateway information to a service server 214, such as a payee payment Gateway server 614. The payee payment gateway 614 sends payer account information and payer OTP to the payer payment gateway 613 in order to validate the information. The payer payment gateway 613 validates the information and sends notification of whether or not the payer account has been validated to the payee payment gateway 614. If the information has been validated the payee payment gateway 614 can direct a third-party, such as a payer bank 615, to a second third-party, such as a payee bank 615. Once the payment is completed, the payee payment Gateway 614 can inform the payer smart phone 601 of transfer of payment.

Figure 13:
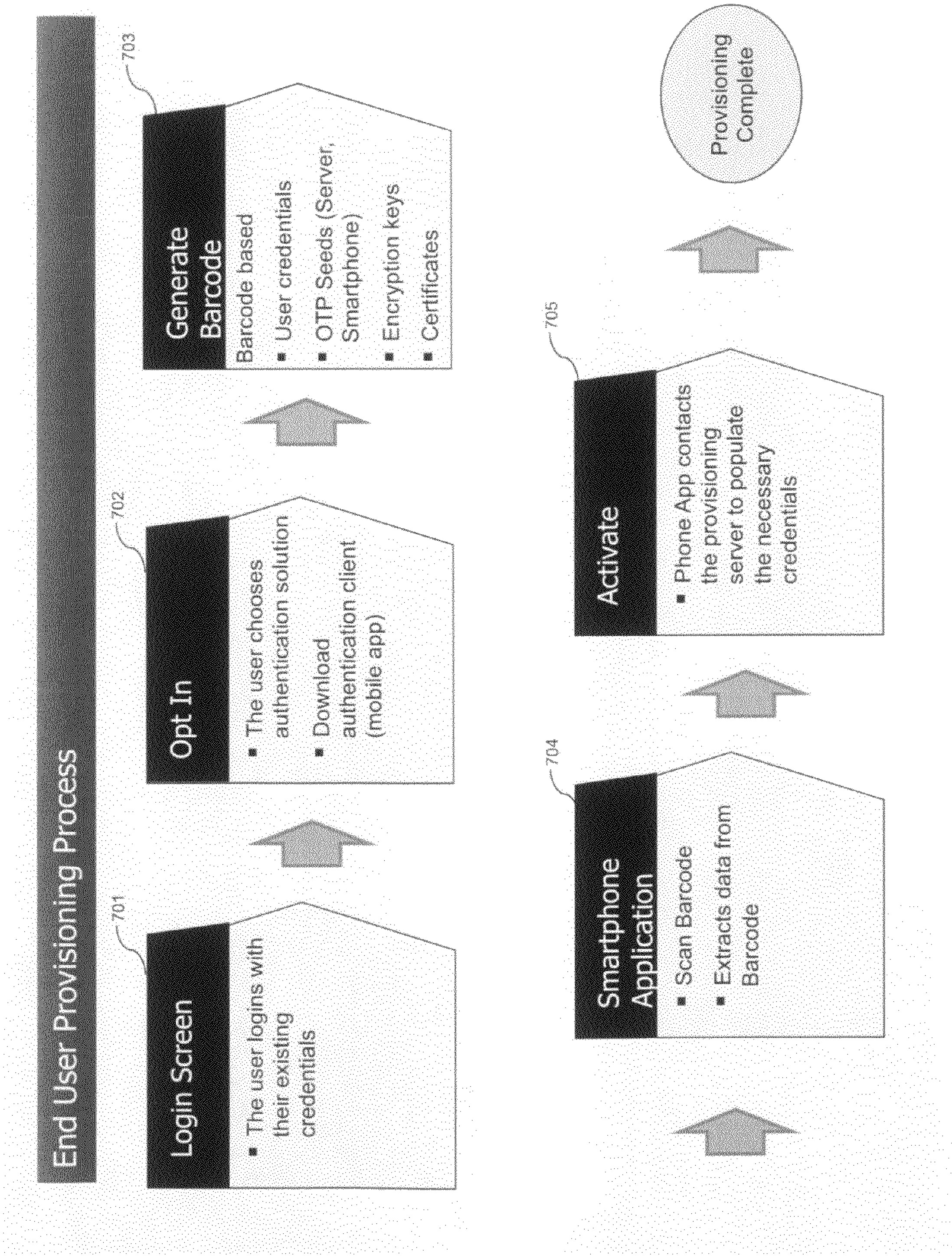
FIG. 13 is a flow chart depicting an end user provisioning process.

FIG. 13 is a flow chart depicting the process of provisioning the portable communications device 201, such as a smartphone, with the right credentials. At a login screen, the user can login to the device 201 using their existing credentials 701. The portable device 201 can provide the user with the opportunity to choose to use an authentication solution according to the system 702. If the user chooses the authentication solution, the device 201 can download authentication client software. Once the software has been downloaded by the device 201, the software prompts the device 703 to generate a barcode based on user credentials, OTP seeds such as server and smartphone information, encryption keys and certificates, among other things. In addition once the software has been downloaded to the device 201, a smartphone application can be loaded onto the device 201 which can permit the user to scan a barcode and extract the information from the barcode 704. The smartphone application can then contact the provisioning server to populate the necessary credentials 705.

In an alternative embodiment, the invention involves a client/server system that comprises an authentication server, online service server, an online service client and a user hand held mobile device equipped with a camera with online authentication client, all of which are connected via a network. The authentication server has a system to generate OTP based on a pre-provisioned shared secret key. The online service server and the authentication server achieve mutual secure connection based on asymmetric keys. The online service client and the online service server are also connected via a network and achieve mutual secure connection using asymmetric keys or using SSL or any other means of securing the communication. The handheld device may also be connected to the network and can connect to the authentication server in a secure manner using pre-specified asymmetric keys or shared secret. The handheld device and the authentication server share common secret. Shared secret is used is also called the symmetric key. This is a method used by the invention for securing the communication.

In an alternative embodiment of the present invention, a user who wants to login to the service provider online service server, opens the login portal on the online server and provides just the user name. In other embodiments, the login portal may be provided or maintained by service client, the login portal or by the service server. The login portal is opened on the service client to access the service server. In one embodiment of a system according to the invention, when a user uses a browser and enter in address of a portal on the service client in the browser to access the server facilities. The online server generates a multi-dimensional dynamic barcode based on online service client/server credentials and OTP so as to uniquely identify the online server and presents it on the login page, either as an alternative or as a replacement of login/password. In addition, or in the alternative embodiment, other methods can be used instead of OTP, such as one-time authentication & certification (OTAC). The user scans the multi-dimensional barcode using the hand-held device that includes an online authentication client or authentication application and a camera. The online authentication client on the hand held device decrypts/decodes the barcode to ensure the validity of the online server. This unique client validation mechanism helps ensure there are no phishing attacks. Once the validity of the server is ensured, the online authentication client takes the extracted data from the barcode, combines it with the user credentials stored on the hand held device and generates a new OTAC. The handheld device then establishes an independent secure connection over carrier network wireless connection or Wi-Fi connection to the authentication server using pre-specified asymmetric keys or shared secret. The hand held device then sends user credentials and the OTAC to the authentication server directly using this secure out-of-band channel. The authentication server validates the user based on the OTAC, shared secret and user credentials. If the authentication server finds the user credentials valid, it contacts the online service server and passes the user credentials as well as user roles/privileges. Based on the user roles/privileges the online service server can automatically provide access to the allowed service components for which the user has been authorization.

In this embodiment, the user only needs to scan the barcode presented on the login screen with the handheld device in order to login and be authorized to proceed to the next screen based on the user rights.

In alternative embodiments, the invention can be used for re-authentication, such as during long sessions or when additional security may be warranted. For example, the user may scan the barcode to validate a transaction and/or keep the current session going.

In an alternative embodiment of the present invention, the inventive methods and systems may work with existing service provider SSL infrastructure. In another alternative embodiment, the present invention can be utilized in place of SSL infrastructure.

In an alternative embodiment of the invention, the user never enters any credentials on the browser, thereby making a Trojan that infects the internet browser software and is capable of drastically modifying transaction contents from within the browser ineffective.

In an alternative embodiment of the invention, the out-of-band outbound mechanism provides an additional level of security due to the original request being different than the outgoing push from the portable device to the service provider server.

Other embodiments of the invention will be apparent to those skilled in the art from consideration of the specification or learned by practice of the invention disclosed herein. It is understood that intended that the specification and examples are exemplary and explanatory only and are not intended to restrict limit the invention as claimed.

The invention claimed is:

1. A method for authentication in a system comprising a user, a service client, a service server, a portable communications device, and an authentication server, wherein the method comprises:

providing a login portal for access by a user, said login portal being in communication with said service server;

transmitting user identification information from the login portal to the service server;

generating a barcode at the service server, wherein the step of generating the barcode includes generating a barcode using the identification information and encrypting third party credentials of the service server, transmitting the barcode by the service server to the service client through at least a first communications channel;

displaying the barcode by the service client;

capturing the barcode with a portable communications device;

decoding the barcode and decrypting the third party server credentials to obtain user information and third party server credentials;

transmitting the user information and third party server credentials to an authentication server via a outbound out-of-band communications channel by the handheld communications device;

the authentication server comparing the user information and third party server credentials to a database of user information and a database of third party server credentials, and the authentication server authenticating the user information and third party server credentials to obtain authentication results;

the authentication server transmitting the authentication results to the service server;

the service server transmitting the authentication results to the service client; and the service client and the service server establishing a secure communication if the authentication results are positive.

2. A method according to claim 1 wherein the login portal is provided at the service client for receiving information for the user, and wherein the service client has a VPN client program with a preconfigured user identifier.

3. A method according to claim 2 wherein the step of generating a barcode includes generating a multi-dimensional dynamic barcode based on said preconfigured user identifier.

4. A method according to claim 2 wherein the service server is a VPN server and said VPN server includes VPN server credentials, and wherein the step of generating a barcode includes generating a multi-dimensional dynamic barcode based on a VPN server credentials and a first OTP thereby uniquely identifying the service server.

5. A method according to claim 4 further comprising the steps of the portable communications device combining said barcode with stored user credentials stored on the portable communications device;

the portable communications device generating a second one time access challenge; and the portable communications device sending user credentials and the second one time access challenge to the authentication server via a secure out-of-band communications channel.

6. A method according to claim 5, wherein the step of transmitting the user information and third party server credentials to an authentication server via an out-of-band communications channel, includes establishing an independent secure connection between said mobile communications device and said authentication server using pre-specified asymmetric keys or shared secrets.

7. A method according to claim 5, further comprising the steps of the authentication server validating the mobile communications device based on a selection of the group consisting of the second one time access challenge, shared secrets and user credentials; and the authentication server transmitting validation information to the service server, said validation information selected from the group comprising successful and failed validation.

8. A method according to claim 1 wherein the step of generating said barcode is performed by the service server.

9. A method according to claim 1 wherein the step of capturing the barcode includes using a portable communications device having an online authentication client and a camera.

10. A method according to claim 9 wherein the step of decrypting said barcode and combining of data extracted from said barcode is performed by said online authentication client.

11. A method according to claim 1 wherein the step of providing a login portal for access by a user is performed either by the service client or by the login portal or by service server.

12. A method according to claim 1 wherein the step of providing a login portal includes receiving identification information from the user by the login portal.

13. A method according to claim 1 wherein said login portal is maintained by service server.

14. A method according to claim 1 wherein said login portal is programmed to receive the user identification information.

15. A method according to claim 1 wherein the third party credentials include third party identification information, service server IP address, authentication server IP address, one-time password, or randomly generated one-time key.

16. A method according to claim 1 wherein the step of displaying the barcode is performed by the service client or by the login portal or by service server.

17. A method according to claim 1 wherein the step of decoding the barcode is performed by the portable communications device.

18. A method according to claim 1 wherein said portable communications device is programmed to decode and decrypt the barcode and third party credentials.

19. A method according to claim 1 wherein the step of the authentication server transmitting the authentication results to the service server includes transmitting the authentication results via a second communications channel, and wherein the step of transmitting the user information and third party server credentials to an authentication server via a outbound out-of-band communications channel by the handheld communications device is out-of-band with respect to the second communications channel.

20. A method according to claim 1 wherein the step of the service server transmitting the authentication results to the service client includes transmitting the authentication results via a third communications channel, and wherein the step of transmitting the user information and third party server credentials to an authentication server via a outbound out-of-band communications channel by the handheld communications device is out-of-band with respect to the third communications channel.

21. A method according to claim 19 wherein the step of transmitting the user information and third party server credentials to an authentication server via a outbound out-of-band communications channel by the handheld communications device requires communication though at least a portion of the outbound out-of-band communications channel that is logically separate from a logical connection over a multiplexed medium used by the second communications channel.

22. A method according to claim 19 wherein the step of transmitting the user information and third party server credentials to an authentication server via a outbound out-of-band communications channel by the handheld communications device requires communication though at least a portion of the outbound out-of-band communications channel that is physically separate transmissions medium than that used by the second communications channel.

23. A method according to claim 20 wherein the step of transmitting the user information and third party server credentials to an authentication server via a outbound out-of-band communications channel by the handheld communications device requires communication though at least a portion of the outbound out-of-band communications channel that is logically separate from a logical connection over a multiplexed medium used by the second communications channel.

24. A method according to claim 20 wherein the step of transmitting the user information and third party server credentials to an authentication server via a outbound out-of-band communications channel by the handheld communications device requires communication though at least a portion of the outbound out-of-band communications channel that is physically separate transmissions medium than that used by the second communications channel.

25. An authentication system for use in a communications network with a third party service server, said authentication system comprising a mobile communication device and an authentication server, wherein the authentication server comprises a communications unit, including a transmitter and a receiver; a processor; and a storage unit; and programming for storing user credentials and associated mobile communication device information; accepting a secure connection from the mobile communications device using security measures selected from the group of shared secrets, digital certificates and encryption mechanisms;

accepting an authentication request from a service server and associating the authentication requests with the associated mobile communication device information; and wherein the mobile communication device comprises a communications unit, including a transmitter and a receiver; a processor; and a storage unit; and programming for:

communicating with the authentication server using an out-of-band communications channel, encrypting and decrypting of information selected from the group comprising shared secrets, digital certificates, user credentials and OTP generation keys; generating a multi-dimensional dynamic barcode based on service server credentials and a first one time access challenge so as to uniquely identify the service server, presenting said multi-dimensional dynamic barcode to a user, scanning said multi-dimensional dynamic barcode, extracting data from said barcode, and combining said barcode with user credentials stored on a mobile communications device and generating a second one time access challenge.

* * * * *